March 13, 1962 J. W. EVELAND 3,024,766
PARLOR STALL
Filed Dec. 31, 1959 2 Sheets-Sheet 1
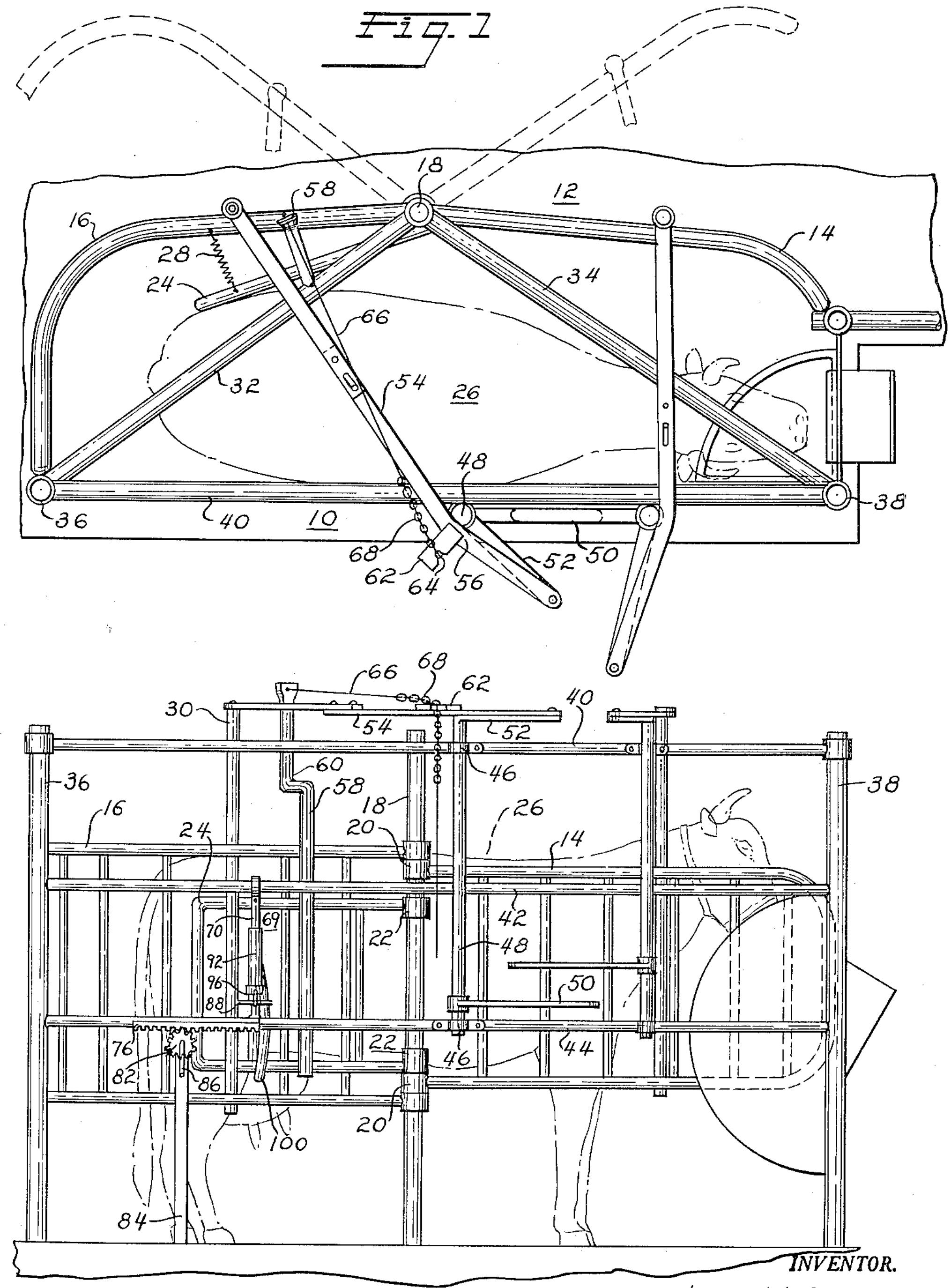
INVENTOR.
JOHN W. EVELAND
BY
Scrivener & Parker
ATTORNEYS March 13, 1962 J. W. EVELAND 3,024,766
PARLOR STALL
Filed Dec. 31, 1959
2 Sheets-Sheet 2
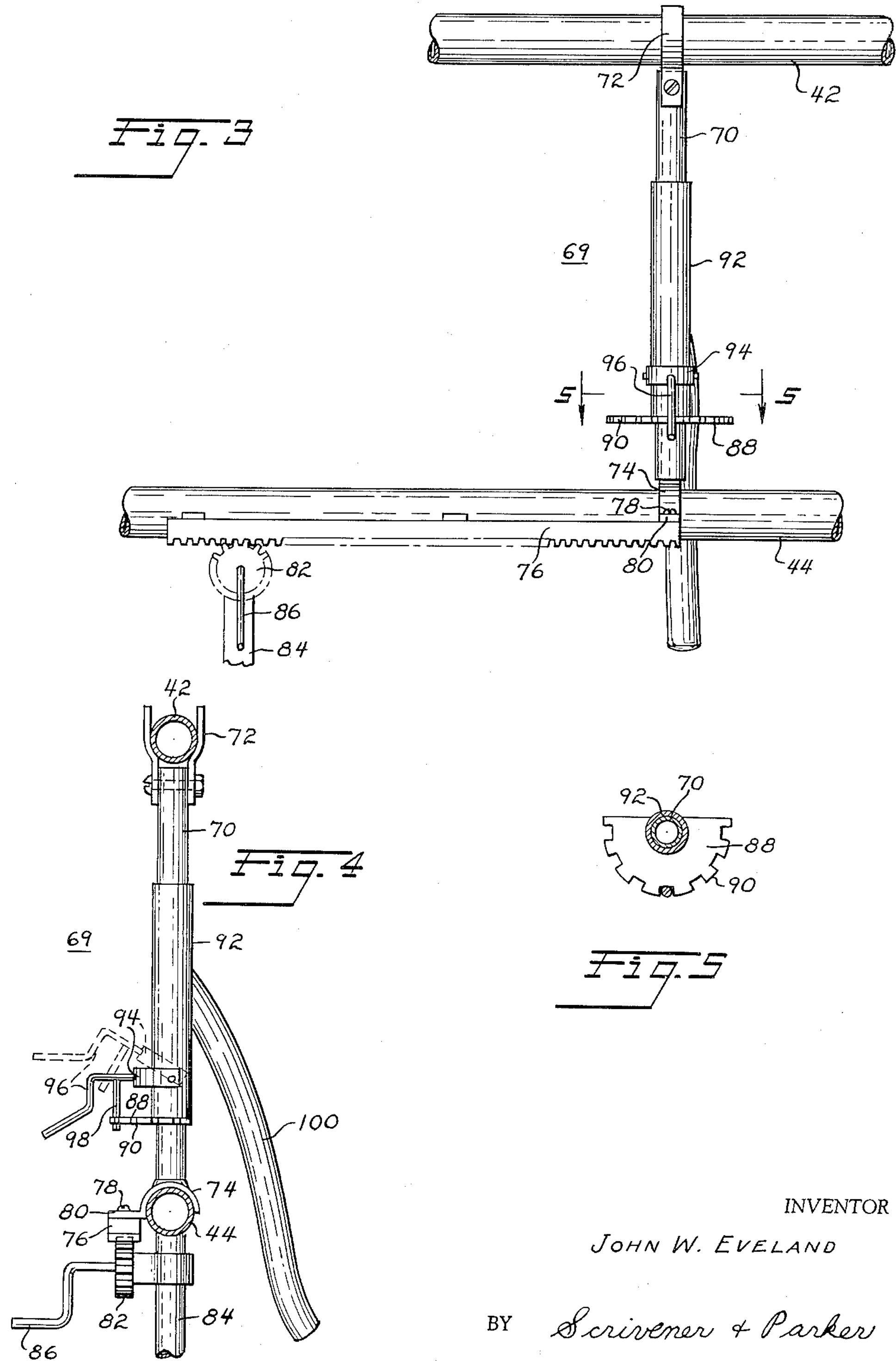
INVENTOR
JOHN W. EVELAND
BY Scrivener & Parker
ATTORNEYS United States Patent Office 3,024,766

Patented Mar. 13, 1962

3,024,766

PARLOR STALL

John W. Eveland, R.F.D., Ridgely, Md.

Filed Dec. 31, 1959, Ser. No. 863,141
12 Claims. (Cl. 119—96)

This invention relates to parlor stalls for the purpose of milking or otherwise operating on cattle and more particularly, to new and novel improvements therein.

Many parlor stalls of the general subject type have been shown in the prior art as comprising a fixed side and a movable side including a pair of gates which open and close to alternately admit, confine and release cattle during the milking process.

There are two major defects in all of these stalls which the present invention overcomes. The first major defect in prior art stalls is that they must all be made sufficiently large so that they will be useful for all sizes of dairy cattle. Thus, if cattle of intermediate sizes are using the stalls, they are allowed such freedom of movement that an attendant standing beside the stall finds it almost impossible to attach a milking machine to them. This is a particularly bad situation for nervous cattle in that this freedom of movement permits them to do serious damage to themselves, the attendant and the milking equipment.

The second major defect in prior art stalls arises from the open nature of the fixed wall. This wall must, of necessity, be of an open grill type of construction so that an attendant may have ready access to the cattle confined therein for the purpose of attaching and removing milking machines and other necessary functions. Since many cattle are inclined to kick as a nervous reflex and since, they kick in a forward direction, the open grill construction of the fixed wall of the stall exposes the attendant to this extreme hazard. Some stalls provide kick bars which are merely additional parallel side bars on the stall which have removable or telescoping sections to allow an attendant to insert equipment in the stall. This feature however, defeats the whole purpose of the kick bar in that when a section of the bar is removed the attendant is more exposed to kick of an animal than he was before. In addition, even with the bar in place, cattle often are able to swing their hind legs up and over the kick bar and render it completely ineffectual.

It is, therefore, an object of this invention to provide a parlor stall which is readily adaptable to all sizes of cattle whereby only a minimum freedom of movement of the animals is permitted.

Another object of this invention is to provide an attachment for parlor stalls which will adapt existing parlor stalls to all sizes of cattle whereby only a minimum freedom of movement of the animals is permitted.

Another object of this invention is to provide an attachment for parlor stalls which may be installed thereon with a minimum of time and expense.

Another object of this invention is to provide an attachment for parlor stalls which will prevent cattle held therein from kicking.

Still another object of this invention is to provide an attachment for parlor stalls which will secure and position cattle therein to provide optimum safety and working conditions.

These and other objects of this invention will become apparent from the following specification and drawings which relate to a preferred embodiment of this invention.

In the drawings:

FIGURE 1 is a top plan view of a parlor stall including the invention.

FIGURE 2 is a side elevation of FIGURE 1.

FIGURE 3 is a detailed side elevation of a part of the invention.

FIGURE 4 is a front view of the structure shown in FIGURE 3.

FIGURE 5 is a partial cross-section taken along line 5—5 of FIGURE 3.

Referring in detail to the drawings and more particularly to FIGURES 1 and 2 a parlor stall is shown as comprising a fixed front wall 10 and a movable rear wall 12 including front and rear swinging gate sections 14 and 16, respectively, the gate section being movable between the solid and dotted line positions shown in FIGURE 1 by pivoting about a centrally located pivot post 18.

The gates 14 and 16 are pivoted as shown at 20 to the above described pivot post 18 by means of sleeves or the like concentric with said post.

Mounted on the pivot post 18 in a like manner to the gates 14 and 16 as shown at 22 is an auxiliary "gate" or hind section engaging member 24 for engaging the hind section of the animal 26 confined in the stall. The auxiliary gate 24 is connected at substantially its free end to the swinging rear gate 16 by means of a coil spring 28 adapted to be stressed in tension by the relative movements of the auxiliary gate 24 and the rear gate 16.

Each of the swinging gates 14 and 16 have a series of links attached thereto which form an actuating means whereby the gates may be opened and closed to alternately admit, confine and release cattle. Since the linkage for each of the respective gates is identical to that of the other, the linkage in conjunction with the rear gate 16 will be described in that it is directly associated with a part of the present invention.

Centrally located with respect to and integral with the rear gate 16 is a vertically extending post 30 which extends, at its upper end, to a height greater than the upper cross braces 32 and 34 of the stall which extend from the pivot post 18 in the movable rear wall 12 to the corner posts 36 and 38, respectively, of the fixed front wall 10. The corner posts 36 and 38 are connected at their upper ends by a horizontal stringer 40 in the plane of the fixed wall 10.

Parallel to and located below the upper stringer 40 are additional stringers 42 and 44 which substantially complete the fixed wall structure. A pair of brackets 46 are mounted one on the upper stringer 40 and one on the lower stringer 44 to rotatably receive a vertical actuating shaft 48 having an actuating handle 50 at the lower end thereof and perpendicular thereto. Fixed to the upper end of said actuating shaft 48 above the level of said upper cross braces and stringer 32, 34 and 40, respectively, is a motion transmitting link 52 perpendicular to the axis of the shaft 48 and parallel to the actuating handle 50 whereby movements of the handle 50 are duplicated by the motion transmitting link 52.

A rigid actuating link 54 is pivotally connected by means of suitable pin type connections between the outer end of the motion transmitting link 52 and the upper end of the vertically extending post 30 on the rear gate 16. An obtuse bend 56 is provided in the actuating link 54 such that an over center action may be effected in closing the rear gate 16 and still allow the actuating link 54 to clear the upper end of the actuating shaft 48 when the rear gate 16 is in the solid line position shown in FIGURE 1.

An actuating means for the auxiliary gate 24 is interconnected with the actuating linkage for the rear gate 16 such that when the rear gate 16 is moved toward the solid line position of FIGURE 1, there will be a relative movement of the auxiliary gate 24 away from the rear gate 16 in the same direction of motion and against the bias of the coil spring 28.

A vertically extending actuating post 58 similar to the post 30 on the rear gate 16 is integrally mounted on the auxiliary gate 24 and extends upward therefrom to a height above the upper cross braces and stringer 32, 34 and 40, respectively. A right angle bend 60 is provided intermediate the auxiliary gate and the upper end of the post 58 in order for the post to clear the upper cross brace 32 and allow full freedom of movement of the auxiliary 24 beneath it. The post 58 forms one part of the actuating means for the auxiliary gate 24.

Another part of the auxiliary gate actuating means comprises a bracket 62 welded or otherwise affixed to the rigid actuating link 54 for the rear gate 16 at the apex of the obtuse bend 56 thereon. A locking or gripping slot 64 is cut in one side of the bracket 62 for a purpose to be hereinafter described.

Connected between the upper end of the vertical post 58 on the auxiliary gate 24 and the bracket 62 is a tension transmitting means 66 having a chain or knotted portion 68 in the vicinity of the bracket 62 whereby the gripping slot 64 in the bracket may adjustably retain the tension means therein by engagement of the knots or the chain links with the walls of the slot 64.

As will be further described in the portion of the specification relating to the operation of this invention the above described auxiliary gate 24 and the actuating means therefor, act to force the confined animal 26 against the fixed front wall 10 of the stall as the front and rear gates 14 and 16, respectively, are moved to the solid line position of FIGURE 1.

Once the animal 26 has been placed in this position the remaiinng part of the invention is actuated to fully secure the animal.

Once the animal 26 has been forced against the fixed wall 10, it is then necessary to immobilize that hind leg of the animal 26 which is adjacent the fixed wall.

In FIGURE 2, the anti-kick or hind leg immobilizing device is generally indicated at 69 and is shown to be slidably mounted between the horizontal parallel stringers 42 and 44 on the fixed wall 10. The device is shown in detail in FIGURES 3, 4 and 5 and will now be described with respect to the combined figures.

The anti-kick device includes a vertical support or post 70 extending between the pair of parallel stringers 42 and 44 on the fixed front wall 10 of the stall. The post 70 is mounted for sliding movement along the length of the stringers by means of a U-shaped upper yoke, 72, partially enclosing the upper stringer 42 and a lower yoke member 74 partially enclosing the lower stringer 44.

In order that the anti-kick device may be properly positioned with respect to the hind leg of the animal 26, a rack and pinion arrangement is connected between the lower stringer 44 and the lower yoke member 74. The rack 76 is fastened at one end by means of a rivet 78 or the like, to an extension 80 on the lower yoke 74. A pinion gear 82 is mounted for rotation on a vertical post 84 on the fixed front wall 10. A crank 86 is provided on the axis of rotation of the pinion gear 82 so that the rack 76 may be moved back and forth along the lower stringer 44 by turning same.

In close proximity with but vertically spaced from the lower yoke 74 and fixed to the vertical support post 70 is a sector gear 88 which extends perpendicularly with respect to the support post 70. A plurality of teeth 90 are provided on the periphery of the sector gear 88 for a purpose to be hereinafter described.

A sleeve 92 is mounted concentric with the support post 70 and rests on the upper side surface of the sector gear 88. The sleeve 92 is rotatable with respect to the support post 70.

Slightly above the sector gear and mounted on the sleeve 92 is a vertically pivoted yoke 94 having a crank arm 96 extending therefrom. A downwardly extending pin 98 integral with the shank of the crank arm 96 is provided to engage the teeth 90 on the sector gear 88 to lock the rotatable sleeve 92 in any desired position. The dotted line indication of the crank arm 96, vertically pivoted yoke 94 and pin 98 in FIGURE 4 shows the general mode of operation.

To complete the anti-kick device, a curved downwardly extending rod 100 is fixed to the rotatable sleeve 92 such that the above described crank, pin and sector gear may be used to properly adjust the rod 100 and move same into engagement with the flank of the animal 26 at a point immediately adjacent the animal's hind leg. Thus, once the rack 76 and pinion 82 have been adjusted to properly position the flank engaging rod 100 in the general vicinity of the hind leg of the animal 26, the crank arm 96 is utilized to rotate the sleeve 92 and swing the rod 100 into engagement with the flank of the animal.

*Operation*

Referring now to FIGURES 1 and 2, the operation of the invention is as follows:

Assuming the gates 14 and 16 to be in the dotted line position of FIGURE 1, an animal 26 is driven into the stall. Once the animal 26 is inside, the actuating means for the gates 18 and 16 are utilized to close the gates and confine the animal 26.

As the rear gate 16 closes, it carries with it in the same direction the auxiliary inner gate 24. Since the inner gate 24 is fastened to the same over-center mechanism as the rear gate 16 by way of vertical post 58, tension transmitting means 66 and bracket 62 on the actuating link 54 for the rear gate 16, the difference in the length of the tension means 66 and the actuating link 54 causes the auxiliary gate 24 to move inwardly towards the animal 26 a greater amount than the rear gate 16. Thus, when the rear gate 16 is closed, the auxiliary gate 24 extends into the stall.

By proper adjustment of the tension means via the section of chain 68 therein and the lock slot 64 in the bracket 62, the auxiliary gate 24 may be made to contact the hind section of the animal 26 and force the animal toward and into contact with the fixed front wall 10 of the stall.

To complete the securing of the animal prior to milking or the like the anti-kick device is brought into proper position by the rack 76 and pinion 82. The flank engaging rod 100 is then swung into contact with the flank of the animal 26 immediately adjacent the hind leg whereby the leg is immobilized from forward movement. Thus, all kicking by the animal 26 is prevented and it is completely secured for subsequent milking or other operations.

As can be seen from the foregoing description and drawings, this invention satisfies a long felt need for a positive safe securing device for cattle in parlor or skeleton wall type stalls.

It is to be understood that the embodiment shown is for the purpose of description only and is not intended to limit the scope of the appended claims.

What is claimed is:

1. A cattle securing means for a parlor stall having a fixed wall and a movable wall including swinging gate means to alternately admit, confine, and release cattle, said securing means comprising, in combination, first means mounted on said swinging gate means, for relative swinging movement therewith, for engaging the hind section of an animal in said stall to progressively force said animal toward and against said fixed wall as said movable wall is moved to a closed position, actuating means for closing said swinging gate means, auxiliary means on said actuating means for swinging said first means relative to and in the same direction as said swinging gate means in response to actuation of said swinging gate means by said actuating means whereby said first means moves to a closed position in advance of said swinging gate means, and further means mounted on said fixed wall and engageable with the flank of said animal to prevent forward movement of the hind leg of said animal which is adjacent to said fixed wall.

2. In a cattle securing means for a parlor stall having a fixed wall and a movable wall including swinging gate means to alternately admit, confine and release cattle, means for engaging the hind section of an animal in said stall to progressively force said animal toward and against said fixed wall as said movable wall is moved to a closed position comprising, first means mounted on said swinging gate means for relative swinging movement therewith and adapted to engage the said hind section of said animal, actuating means for closing said swinging gate means, auxiliary means on said actuating means for swinging said first means relative to and in the same direction as said swinging gate means in response to actuation of said swinging gate means to a closed position by said actuating means, whereby said first means moves to a closed position in advance of said swinging gate means.

3. In a cattle securing means for a parlor stall having a fixed wall and a movable wall including swinging gate means to alternately admit, confine and release cattle, means mounted for relative swinging movement with said gate means for engaging the hind section of an animal in said stall to force said animal toward and against said fixed wall when said movable wall is moved to a closed position, and actuating means for said first-mentioned means comprising flexible tension transmitting means connected at one end to said first-mentioned means and an actuating linkage for said swinging gate means including a bracket fixed to said linkage for releasably gripping said tension transmitting means intermediate the ends thereof whereby upon actuation of said swinging gate means by said linkage said first-mentioned means is moved with and relative to said swinging gate means in such a direction in advance of said gate means as to engage the hind section of an animal in said stall to force said animal toward and against said fixed wall when said movable wall is moved to a closed position.

4. The invention as described in claim 3 wherein said tension means comprises a chain.

5. The invention as described in claim 3 wherein said bracket comprises a substantially flat body portion having a gripping slot therein for releasably engaging said tension means.

6. A parlor stall having a fixed wall and a movable wall including composite swinging gate means, said composite gate means comprising a main outer gate means pivoted for horizontal movement about a centrally located pivot post and an auxiliary gate means pivoted about said post at one end and resiliently attached to said main gate at the other end located interiorly of said main gate means; upper frame members on said stall extending from the upper end of said pivot post to the upper end points of said fixed wall, an actuating link for said main gate extending across said upper frame members, a vertical post integral with said main gate and attached to one end of said actuating link whereby said main gate is opened and closed in response to the movement of said actuating link; a second vertical post integral with said auxiliary gate means and so shaped as to clear said upper frame members, tension transmitting means for biasing said auxiliary gate inwardly of and away from said main gate attached at one end to said second vertical post, bracket means integral with said actuating link at a point substantially adjacent said fixed wall for adjustably gripping said tension means to control the relative movement of said auxiliary gate with respect to said main gate in response to the movement of said actuating link, said bracket being so positioned on said link that upon movement of said main gate to a closed position, said auxiliary gate will have a relative movement away from said main gate in the same direction.

7. The invention as described in claim 6 wherein said actuating link has an obtuse horizontal bend therein at a point substantially adjacent said fixed wall and said bracket for gripping said tension means is integral with said link at the apex of said bend, whereby movement of said main gate by said actuating link results in an amplified movement in the same direction of said auxiliary gate by said tension means.

8. In a cattle securing means for a parlor stall having a fixed wall and a movable wall including swinging gate means to alternately admit, confine and release cattle, means for immobilizing the hind leg of an animal which is adjacent to said fixed wall to prevent said animal from kicking or moving in a forward direction comprising, vertical support means mounted on said fixed wall, mounting means concentric with and rotatable with respect to said support means and a downwardly extending curved rod integral with said mounting means and adapted to be rotated thereby into engagement with the flank of said animal immediately adjacent the hind leg whereby said leg is immobilized.

9. The invention as defined in claim 8, wherein said mounting means comprises a sleeve.

10. In a cattle securing means for a parlor stall having a fixed wall including vertical end posts with a plurality of vertically spaced parallel stringers therebetween and a movable wall including swinging gate means to alternately admit, confine and release cattle, means for immobilizing the hind leg of an animal which is adjacent to said fixed wall to prevent said animal from kicking or moving in a forward direction comprising, vertical support means mounted between a pair of said stringers for sliding movement along the length thereof whereby said support means may be properly positioned with respect to said animal, mounting means concentric with and rotatable with respect to said support means and a downwardly extending bar integral with said mounting means adapted to swing toward and contact the flank of said animal immediately adjacent the hind leg in response to the rotation of said mounting means.

11. The invention defined in claim 10, wherein said mounting means comprises a sleeve.

12. In a cattle securing means for a parlor stall having a fixed wall including vertical end posts with a plurality of vertically spaced parallel stringers therebetween and a movable wall including swinging gate means to alternately admit, confine and release cattle, means for immobilizing the hind leg of an animal which is adjacent to said fixed wall to prevent said animal from kicking or moving in a forward direction comprising, vertical support means mounted between a pair of said stringers for sliding movement along the length thereof whereby said support means may be properly positioned with respect to said animal, sleeve means concentric with and rotatable with respect to said support means, a sector gear integral with said support means in juxtaposition and supporting relationship with said sleeve means, a lever pivoted on the lower end of said sleeve having a dependent pin thereon such that vertical movement of said lever about said pivot causes said pin to engage and disengage with said sector gear to lock said sleeve in a desired position and a downwardly extending bar integral with said sleeve adapted to swing toward and contact the flank of said animal immediately adjacent the hind leg in response to the rotation of said sleeve means.

References Cited in the file of this patent

UNITED STATES PATENTS

| | | |
|---|---|---|
| 1,621,760 | Stader et al. | Mar. 22, 1927 |
| 1,754,752 | Grim | Apr. 15, 1930 |
| 2,692,577 | Thomas | Oct. 26, 1954 |
| 2,904,005 | Mielke et al. | Sept. 15, 1959 |
| 2,957,451 | Brockman | Oct. 25, 1960 |